(12) United States Patent
Malden et al.

(10) Patent No.: US 8,423,374 B2
(45) Date of Patent: Apr. 16, 2013

(54) METHOD AND SYSTEM FOR PROCESSING INTELLIGENCE INFORMATION

(75) Inventors: Matthew Scott Malden, San Francisco, CA (US); Daniel Edward Israel, San Francisco, CA (US); Robert Brent Pinkerton, San Francisco, CA (US); Frank Warren Bishop, Jr., Los Altos, CA (US); Prashant B. Patel, Cupertino, CA (US); Christopher Scott Nash, San Mateo, CA (US); Rahul Viswanathan, Fremont, CA (US); Arun Abichandani, Alameda, CA (US); Rajani Yelkur, Fremont, CA (US); Hang Yee Wong, Oakland, CA (US); Jackson Chan, Elk Grove, CA (US)

(73) Assignee: Siebel Systems, Inc., San Mateo, CA (US)

( * ) Notice: Subject to any disclaimer, the term of this patent is extended or adjusted under 35 U.S.C. 154(b) by 1165 days.

(21) Appl. No.: 10/277,549

(22) Filed: Oct. 21, 2002

(65) Prior Publication Data
US 2007/0198275 A1    Aug. 23, 2007

Related U.S. Application Data

(60) Provisional application No. 60/392,236, filed on Jun. 27, 2002.

(51) Int. Cl.
*G06Q 10/00* (2012.01)
(52) U.S. Cl.
USPC .......................................................... 705/1.1
(58) Field of Classification Search ................ 705/1
See application file for complete search history.

(56) References Cited

U.S. PATENT DOCUMENTS

| | | | | |
|---|---|---|---|---|
| 4,974,191 | A |  | 11/1990 | Amirghodsi et al. ............. 704/8 |
| 5,303,149 | A | * | 4/1994 | Janigian ............................ 707/6 |
| 5,386,559 | A |  | 1/1995 | Eisenberg et al. ........... 707/201 |
| 5,434,994 | A |  | 7/1995 | Shaheen et al. ............... 709/223 |
| 5,493,692 | A |  | 2/1996 | Theimer et al. ............. 455/26.1 |
| 5,548,506 | A |  | 8/1996 | Srinivasan ........................ 705/8 |

(Continued)

FOREIGN PATENT DOCUMENTS

WO    WO 0034897 A1 *  6/2000

OTHER PUBLICATIONS

"Introducing Vality Veri-Quest to Identify and Track the Records of 'Most Wanted' Suspects," Business Wire, Nov. 5, 2001.*

(Continued)

*Primary Examiner* — Jonathan Ouellette
(74) *Attorney, Agent, or Firm* — Campbell Stephenson LLP

(57) ABSTRACT

A method and system for routing intelligence information related to security. The security system provides rules that identify conditions and routing instructions that are to be applied to intelligence information. A security organization may create and modify rules to ensure the appropriate routing of intelligence information in a timely manner. The security system may receive intelligence information from various sources. Regardless of the form or source of intelligence information, the security system analyzes the intelligence information to determine whether any conditions of the rules are satisfied. When a condition of a rule is satisfied, the security system sends a notification of the intelligence information in accordance with the routing instructions for that rule. In this way, intelligence information can be automatically and quickly routed to the appropriate security personnel for further processing.

18 Claims, 11 Drawing Sheets

U.S. PATENT DOCUMENTS

| | | | |
|---|---|---|---|
| 5,680,611 A * | 10/1997 | Rail et al. | 707/101 |
| 5,715,371 A | 2/1998 | Ahamed et al. | 706/10 |
| 5,745,900 A * | 4/1998 | Burrows | 707/102 |
| 5,862,325 A | 1/1999 | Reed et al. | 709/201 |
| 6,141,663 A | 10/2000 | Hunkins et al. | 707/201 |
| 6,167,433 A | 12/2000 | Maples et al. | 709/204 |
| 6,182,221 B1 | 1/2001 | Hsu et al. | 713/186 |
| 6,237,027 B1 | 5/2001 | Namekawa | 709/206 |
| 6,263,349 B1 * | 7/2001 | Anderson | 707/205 |
| 6,263,362 B1 | 7/2001 | Donoho et al. | 709/207 |
| 6,324,262 B1 | 11/2001 | Tuttle | 379/69 |
| 6,353,936 B2 | 3/2002 | Donoho et al. | 709/206 |
| 6,369,705 B1 | 4/2002 | Kennedy | 340/506 |
| 6,442,241 B1 | 8/2002 | Tsumpes | 379/45 |
| 6,462,665 B1 | 10/2002 | Tarlton et al. | 340/601 |
| 6,542,896 B1 * | 4/2003 | Gruenwald | 707/101 |
| 6,601,076 B1 | 7/2003 | McCaw et al. | 707/203 |
| 6,606,744 B1 | 8/2003 | Mikurak | 717/174 |
| 6,633,240 B1 | 10/2003 | Sweatt | 340/995.1 |
| 6,654,786 B1 | 11/2003 | Fox et al. | 709/203 |
| 6,658,423 B1 * | 12/2003 | Pugh et al. | 707/102 |
| 6,724,861 B2 | 4/2004 | Newland et al. | 379/49 |
| 6,745,689 B2 | 6/2004 | Stevens | 455/404.1 |
| 6,757,689 B2 | 6/2004 | Battas et al. | 707/101 |
| 6,829,478 B1 | 12/2004 | Layton et al. | 455/428 |
| 6,901,437 B1 | 5/2005 | Li | 709/219 |
| 7,177,909 B2 | 2/2007 | Stark et al. | 709/206 |
| 7,246,150 B1 | 7/2007 | Donoho et al. | 709/204 |
| 7,343,302 B2 | 3/2008 | Aratow et al. | 705/1 |
| 7,616,942 B2 | 11/2009 | Karl et al. | 455/404.1 |
| 2002/0129081 A1 | 9/2002 | Rai et al. | 709/102 |
| 2002/0165724 A1 | 11/2002 | Blankesteijn | 705/1 |
| 2002/0188522 A1 | 12/2002 | McCall et al. | 705/26 |
| 2003/0009385 A1 | 1/2003 | Tucciarone et al. | 705/26 |
| 2003/0037094 A1 * | 2/2003 | Douceur et al. | 709/201 |
| 2003/0041059 A1 * | 2/2003 | Lepien | 707/5 |
| 2003/0055689 A1 | 3/2003 | Block et al. | 707/5 |
| 2003/0066030 A1 | 4/2003 | Curns et al. | 715/511 |
| 2003/0097359 A1 * | 5/2003 | Ruediger | 707/6 |
| 2003/0141971 A1 | 7/2003 | Heiken | 340/506 |
| 2003/0179089 A1 | 9/2003 | Sweatt | 340/539.1 |
| 2003/0193394 A1 | 10/2003 | Lamb | 340/539.28 |
| 2003/0222777 A1 | 12/2003 | Sweatt | 340/539.1 |
| 2004/0008125 A1 | 1/2004 | Aratow et al. | 340/870.07 |
| 2005/0198087 A1 | 9/2005 | Bremers | 707/204 |
| 2005/0222994 A1 * | 10/2005 | Douceur et al. | 707/3 |
| 2006/0265462 A1 | 11/2006 | Stark et al. | 709/206 |
| 2007/0192422 A1 | 8/2007 | Stark et al. | 709/206 |
| 2007/0207771 A1 | 9/2007 | Bowser et al. | 455/404.1 |

OTHER PUBLICATIONS ("Introducing Vality Veri-Quest to identify and Track the Records of 'Most Wanted' Suspects," Business Wire, Nov. 5, 2001).*

(www.mathworld.wolfram.com, retrieved with the Internet Wayback Machine <www.archive.org>, date: May 10, 2000).*

Matthews, William, "In the system," www.FCW.com, Jan. 21, 2002.*

Myron, David, "Targeting Terrorism," CRM Magazine, Apr. 2002.*

The Emergency Email Network, Inc., Resource Document #RC202903, published Jun. 11, 2002, http://web.archive.org/web/20020611220429/http://www.emergencymailnetwork.com/rc202903.html, pp. 1-7.

OpenAir.com, Product Update—Jun. 21, 2001, http://web.archive.org/web/20011007153900/http"//www.openair.com/home/n_p_update062101.html.10-2001.

Tim Pyron, Special Edition Using Microsoft Project 2000, Sep. 2000, Que Publishing, Introduction, Chapter 4 and 20.

IBM, OpenAir.com 'Turbocharges' Software for Expanded ASP delivery, Aug. 2001; 1 page PSA Products, Siebel eBusiness, Jul. 20, 2001; 6 pages.

Siebel Professional Services Automation: Empowering Services Organizations to Maximize Customer Satisfaction and Increase Revenue, Siebel eBusiness, Jul. 18, 2001, 2 pages.

Microsoft Project 2002: A Simple Step to Easier Project Management, Microsoft Corporation, Aug. 8, 2002, p. 1.

Microsoft Project: A Simple Step to Easier Project Management, Microsoft Project 2002: It's Easier Than You Think, Microsoft Corporation, Aug. 2002, 10 pages.

Microsoft Project Standard 2002 Tour, Jun. 6, 2002, 4 pages.

Microsoft Project 2002: Product and Technology Catalog, Microsoft Corporation, Dec. 9, 2002, pp. 1-3.

Microsoft Project 2002 Product Guide, Microsoft Corporation, Jun. 6, 2002, p. 1.

Microsoft Project 2002: New Feature Guide, Microsoft Corporation, 2002, pp. 1-82.

Aiken, Peter, Microsoft Computer Dictionary 2002, Microsoft Press, Fifth Edition.

United States Patent and Trademark Office, Interim Guidelines for Examination of Patent Applications for Patent Subject Matter Eligibility, Oct. 2005.

OpenAir, "OpenAir Product Update" Sep. 21, 2000, OpenAir.com, p. 1-4.

* cited by examiner

To: LAPD — 201
From: J.Q. Public — 202
Subject: America's Most Wanted — 203

I just saw the show America's Most Wanted featuring Joe Terrorist. My neighbor looks a lot like him. What should I do? — 204

Investigation Report

Suspect Name: Joe Terrorist — 301    Status: Closed ▽ — 302
Aliases: Joe Guerilla
Type of Report: Sighting Investigation ▶ — 303
Date: 6/01/01 — 304
Comments: — 305
We investigated the lead by J.Q. Public that his neighbor looks like this guy. The neighbor is a U.S. citizen of questionable character who teaches second grade at a local elementary school in Any Town.

FIG. 6

600 Routing Rules

| Condition | Route To |
|---|---|
| Suspect identified in intelligence | FBI Agent assigned CIA Agent assigned for each identified terrorist |
| FBI Alert and warning "Extreme" | All |
| Citizen generated lead and suspect identified | Local agent assigned |
| Citizen generated lead, but no suspect identified | Queue |

| | |
|---|---|
| To: | Distribution List |
| From: | FBI-ALERT |
| Subject: | Joe Terrorist: Extreme Warning |
| | We have detected an alarming number of communications relating to Joe Terrorist. Please apprehend Joe Terrorist immediately. His last known location was Any Town. He may be targeting a grade school. |
| Alert Level: | Extreme |

401, 402, 403, 404

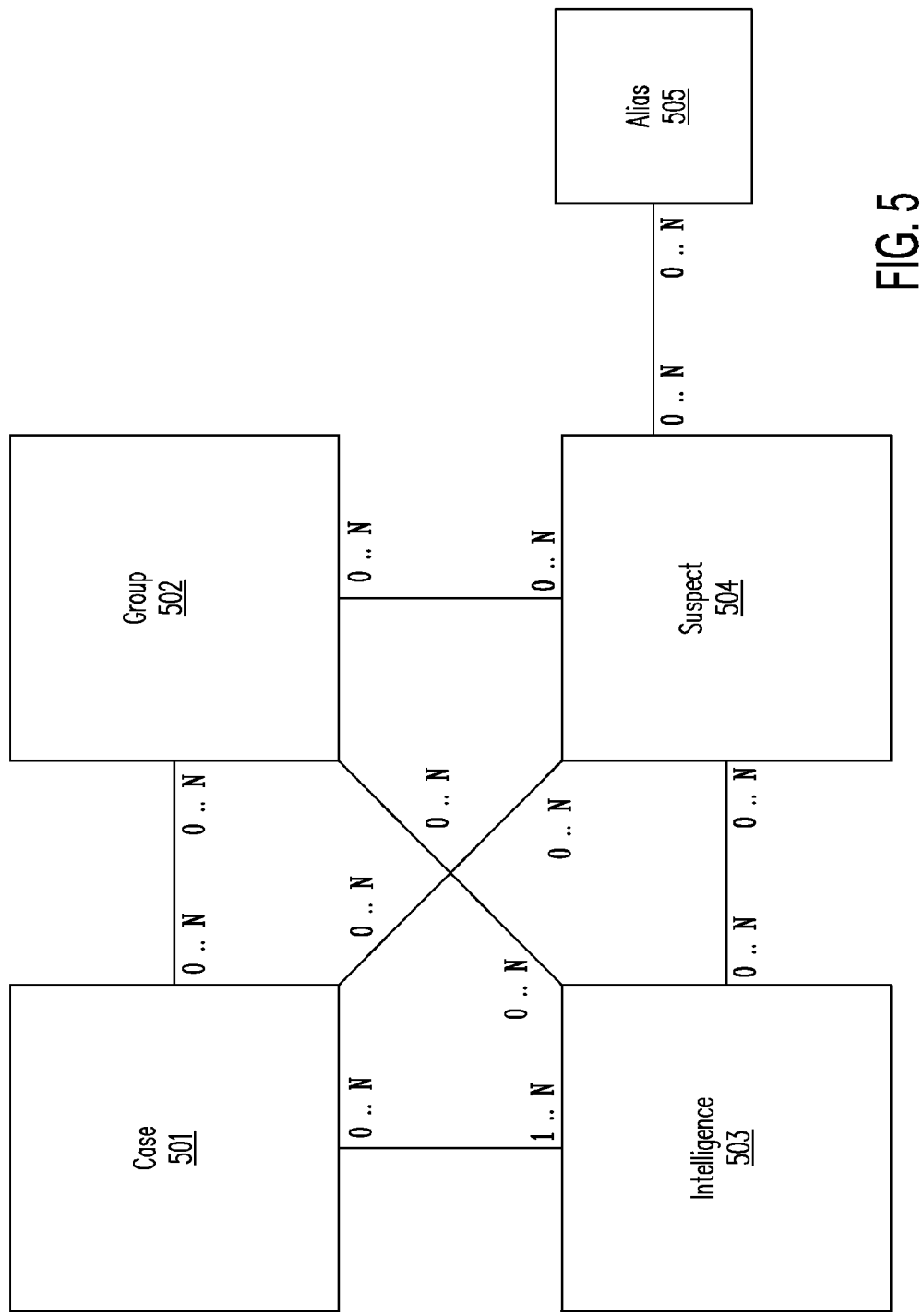

METHOD AND SYSTEM FOR PROCESSING INTELLIGENCE INFORMATION

CROSS REFERENCE TO RELATED APPLICATIONS

This application claims the benefit of U.S. Provisional Patent Application No. 60/392,236 filed Jun. 27, 2002, entitled, "METHOD AND SYSTEM FOR PROCESSING INTELLIGENCE INFORMATION." This application is related to U.S. patent application Ser. No. 10/185,871, filed Jun. 27, 2002, entitled, "IDENTIFYING SECURITY THREATS," to U.S. Provisional Patent Application No. 60/392,719, filed Jun. 27, 2002, entitled, "DISSEMINATING INFORMATION ABOUT SECURITY THREATS," and U.S. patent application Ser. No. 10/244,137, filed Sep. 12, 2002, entitled, "DISSEMINATING INFORMATION ABOUT SECURITY THREATS," all of which are hereby incorporated by reference in their entirety.

TECHNICAL FIELD

The described technology relates generally to processing intelligence information and particularly to tracking aliases of suspects and routing intelligence information.

BACKGROUND

As the security of governments, organizations (e.g., businesses), and individuals continues to be threatened by various groups and individuals (e.g., terrorist groups and their members), it is increasingly important to identify future security threats (e.g., planned attacks) before they occur so they can be prevented. In many cases, security personnel (e.g., law enforcement officials) whose job it is to prevent or otherwise address security threats do not have access to the necessary information to identify those threats before they occur (e.g., information about the attack preparation activities of terrorist groups). In other situations, security personnel may have access to the necessary information, but the information may be obscured by an overabundance of irrelevant information. Finally, the intelligence information may be in an unanalyzed form from which it is difficult to identify the security threats. For example, vast amounts of information, such as reports and other communications, may be generated and exchanged by security personnel. Because of the volume of such information, it is not practical to expect a security organization to review every single piece of information and route it to the appropriate security personnel for further processing in a timely manner. As a result, some valuable information may be left unprocessed for quite some time, or it may never get processed at all. In addition, information about individuals may identify the same individual in different ways. For example, a name in a foreign language may have many acceptable but different English-language translations. In such a case, it may be difficult to identify the relationship between two pieces of information that relate to the same individual because of the differences in name-translation. In addition, various security systems (e.g., an FBI suspect database and an Interpol information system) may each contain different information that cumulatively would provide valuable intelligence, but individually each piece of information provides little insight. Moreover, various security systems may store their information in vastly different ways, languages, and formats. As a result, there has been very little integration of the information from these diverse security systems.

Accordingly, it would be beneficial to provide automated techniques for analyzing various types of information related to possible security threats and routing that information to appropriate security personnel for further processing and identifying of information that relates to suspect individuals and groups.

BRIEF DESCRIPTION OF THE DRAWINGS

FIG. 2 illustrates an electronic mail message that may be received by a security organization.

FIG. 3 illustrates an investigation report that would be generated after completing the investigation relating to the electronic mail message of FIG. 2.

FIG. 4 illustrates an electronic mail message that may be received from government agencies such as the FBI.

FIG. 5 is a block diagram illustrating the tables for storing security-related information in one embodiment.

FIG. 6 illustrates a table containing routing rules.

FIG. 13 is a block diagram illustrating various objects defined as part of the security object model.

DETAILED DESCRIPTION

Figure 1:
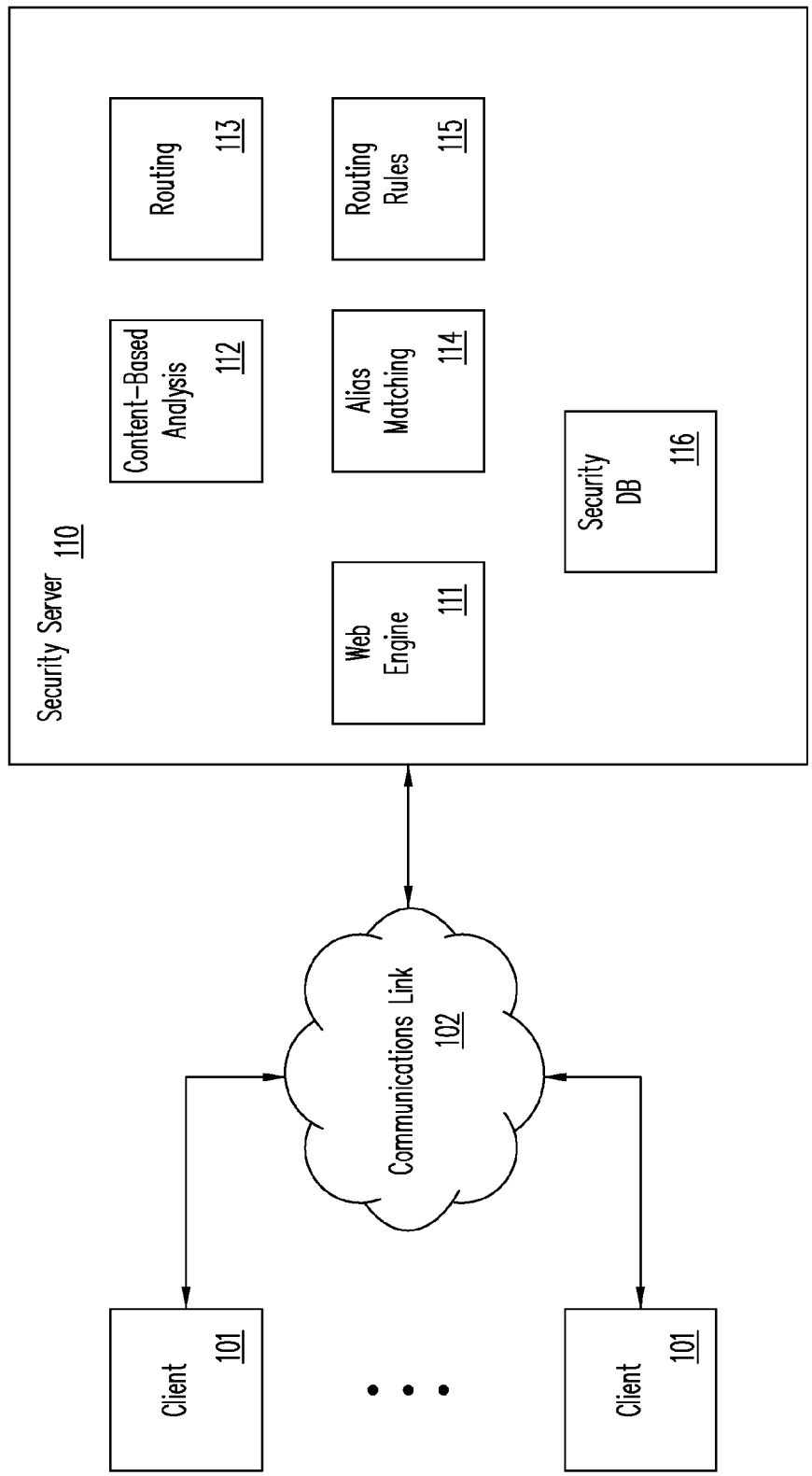
FIG. 1 is a block diagram illustrating the overall organization of the security system.

A method and system for routing intelligence information related to security is provided. In one embodiment, the security system provides rules that identify conditions and routing instructions that are to be applied to individual pieces of intelligence information. For example, a rule may specify that an electronic mail message received by a security organization (e.g., a local police department) should be routed to each member of a terrorist task force when the message contains the keyword "terrorist." The security organization may create and modify rules to ensure the appropriate routing of intelligence information in a timely manner. The security system may receive intelligence information from various sources via various input mechanisms. For example, the security system may receive information directly from other security systems, it may receive electronic mail messages from the public reporting suspicious activity, it may receive alerts from government agencies (e.g., the FBI and CIA), it may receive reports from the security personnel of the security organization utilizing the system via a user interface, etc.

Regardless of the form or source of intelligence information, the security system analyzes the intelligence information to determine whether any conditions of the rules are satisfied. This analysis may include searching the intelligence information for keywords, identifying overall concepts or topics of the intelligence information (e.g., using natural language processing techniques), identifying individuals or groups who are the subject of the intelligence information, etc. When a condition of a rule is satisfied, the security system sends a notification of the intelligence information in accordance with the routing instructions for that rule. The notification may be provided via the home page of a security system, an electronic mail message, a pager message, a wireless personal digital assistant, a cell phone, or a facsimile, depending on the urgency of the intelligence information. In this way, intelligence information can be automatically and quickly prioritized and routed to the appropriate security personnel for further processing.

In another embodiment, the security system identifies duplicate records of intelligence information relating to an individual. The security system may maintain a database that contains a record for each individual who has been identified to the system. However, because one individual may be identified by different names or by different spellings of the same name, the security system may have multiple records representing the intelligence information for the same individual. To identify such duplicate records, the security system generates a de-duplication key for each record that is derived from the contents of the various fields of the record. For example, the de-duplication key may be a hash value generated by applying a hashing function to the name, the address, and the eye and hair color fields of the record. The security system then determines whether any of the de-duplication keys of a record matches the de-duplication keys for other records. If so, the security system indicates that the records may be related to the same individual. The security system may apply a metric, such as a mathematical distance metric, to de-duplication keys to determine whether the keys match. In this way, the security system can help ensure that intelligence information gathered from various sources about a single individual is correctly attributed to that individual.

In another embodiment, the security system tracks known aliases of individuals from intelligence information that has been gathered. The security system may maintain a database with a record for each individual that is associated with intelligence information. Each individual may be assigned a primary identifier. Whenever security personnel become aware of an alias or other moniker of an individual, the security system allows the security personnel to store that alias in conjunction with the record for that individual. When new intelligence information is received that identifies the individual by a listed alias, the security system can use the stored alias information to associate the intelligence information with the correct record in the database. In this way, individuals can be correctly tracked regardless of the alias that is associated with particular pieces of intelligence information.

In another embodiment, a security application system executes security processes (e.g., business processes) that access information provided by diverse security systems. These diverse security systems may store intelligence information in different formats, languages, and organizations. For example, an FBI suspect database may store its intelligence information in a very different way than a CIA suspect database. The security application system may contain a security process store that defines various security processes. These security processes access security information via a security object model that is defined explicitly for the security environment. For example, the object model may include the definition of a suspect object, a group object, a communications object, etc. The security processes interact with the common objects to access information from the various security systems in a uniform manner. The security application system provides transformations that are used to automatically transform intelligence information from the various security systems into the format of the common objects. The security application system also provides a transport mechanism for transporting security information between the security application system and the security systems. Each security system may have an adapter that allows it to communicate with the transport mechanism. The security application system, also referred to as the universal security application network, provides a framework for execution of security processes that process and exchange intelligence information between various security systems.

FIG. 1 is a block diagram illustrating the overall organization of the security system. The security system 110 may be connected via communications link 102 to various client computers 101. The client computers may include personal computers, server computers of various security organizations, etc. The communications link may include the Internet, local area networks, wide area networks, dial-up connections, etc. The security system may include a web engine 111, a content-based analysis component 112, a routing component 113, an alias matching component 114, a routing rules store 115, and a security database 116.

The web engine receives intelligence information from the client computers and receives requests to access intelligence information stored on the security system. The web engine routes intelligence information or requests for intelligence information to the appropriate component of the security system. The content-based analysis component analyzes received intelligence information to determine whether any of the routing rules are satisfied. The received intelligence information may include electronic mail messages, reports generated by security personnel, alerts received from security organizations, intercepted communications, etc. The routing component routes the intelligence information in accordance with the routing instructions of the routing rules that the content-based analysis component indicates have been satisfied. For example, intelligence information relating to a certain suspect may be sent to the security personnel who are responsible for tracking the whereabouts of that suspect. The routing rules store contains a mapping of conditions to routing instructions. When intelligence information satisfies a condition, then the intelligence information is routed in accordance with the routing instructions. The alias matching component may detect suspect records that relate to the same individual and are thus considered duplicates. The alias matching component may compare the contents of various fields of the records to determine whether the records may represent the same individual. In addition, the alias matching component allows for the recording of aliases for an individual so that intelligence information identified with an alias is associated with the correct individual. The security database may contain information related to investigations (or cases), groups, suspects, and other intelligence information. When an investigation is started, an investigation record is created that may relate to one or more groups and one or more suspects. The investigation may also have associated intelligence information. Each group may have one or more associated suspects and may have associated intelligence information. Each suspect may have associated intelligence information.

The computers (e.g., client computer and security server) may include a central processing unit, memory, input devices (e.g., keyboard and pointing devices), output devices (e.g., display devices), and storage devices (e.g., disk drives). The memory and storage devices are computer-readable media that may contain instructions that implement the security system. In addition, the data structures and message structures may be stored or transmitted via a data transmission medium, such as a signal on a communications link.

FIG. 2 illustrates an electronic mail message that may be received by a security organization. The electronic mail message 200 includes to information 201, from information 202, subject information 203, and message information 204. In this case, the electronic mail message indicates that someone thinks their neighbor looks like a suspect featured in a television show. When the security system receives this intelligence information, it associates the electronic mail message with the identified suspect. The content-based analysis component may analyze the message to identify the name of the suspect. The security system also routes the electronic mail message to the appropriate security personnel as indicated by the routing rules. The security personnel may trigger an investigation to check out the neighbor.

FIG. 3 illustrates an investigation report that would be generated after completion of the investigation relating to the electronic mail message of FIG. 2. The record 300 includes the name and aliases of the suspect 301, the status of the investigation 302, the type of report 303, the date of the report 304, and a comments section 305. One skilled in the art will appreciate that many other types of information may be included in such a report, including affiliated groups, investigation priority, investigating personnel, etc. In this example, the security personnel investigated the intelligence information and apparently believed that the neighbor was probably not the suspect. The security system stores this investigation report in association with the suspect.

FIG. 4 illustrates an electronic mail message that may be received from government agencies such as the FBI. As described above, the security system can receive information through various input mechanisms (electronic mail being one example). The electronic mail message 400 includes To: information 401, From: information 402, Subject: information 403, and intelligence information 404. In this case, the electronic mail message may have predefined keywords, such as "alert level," and may have predefined information on the subject line, such as the name of the suspect. When the security system receives this message, it identifies the keyword information and other predefined information. The security system then stores the information in association with the identified suspect. The security system then routes the electronic mail message in accordance with the routing rules. In this case, the security personnel who created the investigation report of FIG. 3 may receive the electronic mail message along with information explaining why they received the report. In this case, the security personnel received the report because of a related investigation. In such a case, the security personnel should identify the subject of this electronic mail message with the neighbor that was the subject of the investigative report.

FIG. 5 is a block diagram illustrating the tables for storage of security-related information in one embodiment. The case table 501 includes a case record for each investigation that has been created. The group table 502 contains a record for each group or organization of suspects that has been identified. The intelligence table 503 contains a record for each piece of intelligence information that has been received or generated by the security system. The suspect table 504 contains an entry for each suspect that has been identified. The alias table 505 contains an entry for each alias of each suspect. A case record may be associated with one or more groups and with one or more suspects and may have associated intelligence information. A record of the group table may be associated with multiple suspects and may have associated intelligence information. A record of the suspect table may have associated intelligence information. The security system may store the information as tables of a relational database in one embodiment.

FIG. 6 illustrates a table containing routing rules. Each record 601-604 of the routing rules store 600 contains a condition and routing instructions. For example, the condition of the first record 601 of the routing rules store is that the intelligence information identifies a suspect. For example, the electronic mail message of FIG. 2 identified a suspect. Thus, that electronic mail message satisfies this condition. The security system, after determining that the condition is satisfied, routes the electronic mail message in accordance with the routing instructions. In this case, the routing instructions indicate that the electronic mail message is to be sent to the FBI agent assigned to monitor the suspect, and to the CIA agent assigned to monitor the suspect.

Figure 7:
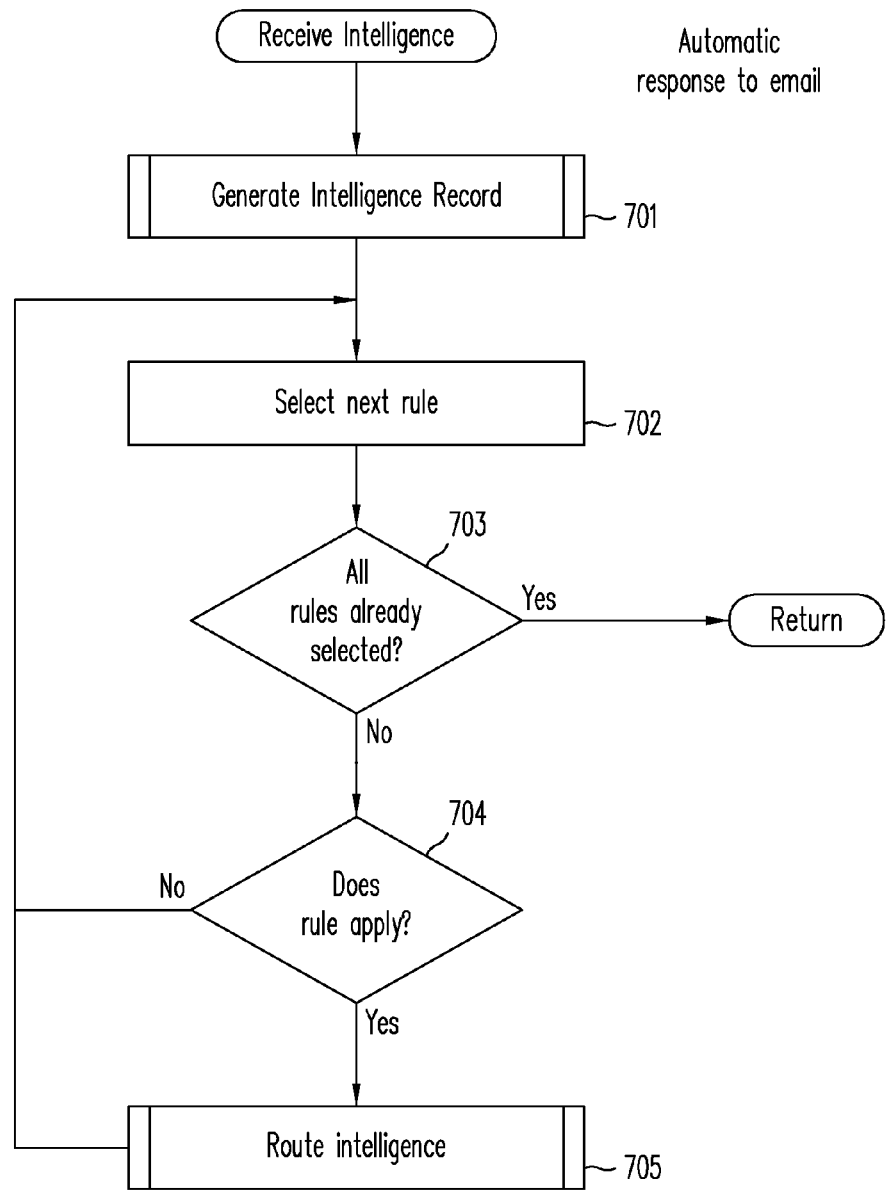
FIG. 7 is a flow diagram illustrating the processing of the security system when intelligence information is received in one embodiment.

FIG. 7 is a flow diagram illustrating the processing of the security system when intelligence information is received in one embodiment. The intelligence information may be received via any mechanism (e.g., electronic mail message or data entry of intercepted communications). In block 701, the component generates an intelligence record in the security database. In blocks 702-705, the component loops, determining whether each routing rule applies to the intelligence information and, if so, routing the intelligence information in accordance with the routing instructions of that rule. In block 702, the component selects the next routing rule from the routing rules store. In decision block 703, if all the routing rules have already been selected, then the component completes, else the component continues at block 704. In decision block 704, if the selected routing rule applies (i.e., the condition is satisfied) to the intelligence information, then the component continues at block 705, else the component loops to block 702 to select the next routing rule. In block 705, the component routes the intelligence information in accordance with the routing instructions and loops to block 702 to select the next routing rule.

Figure 8:
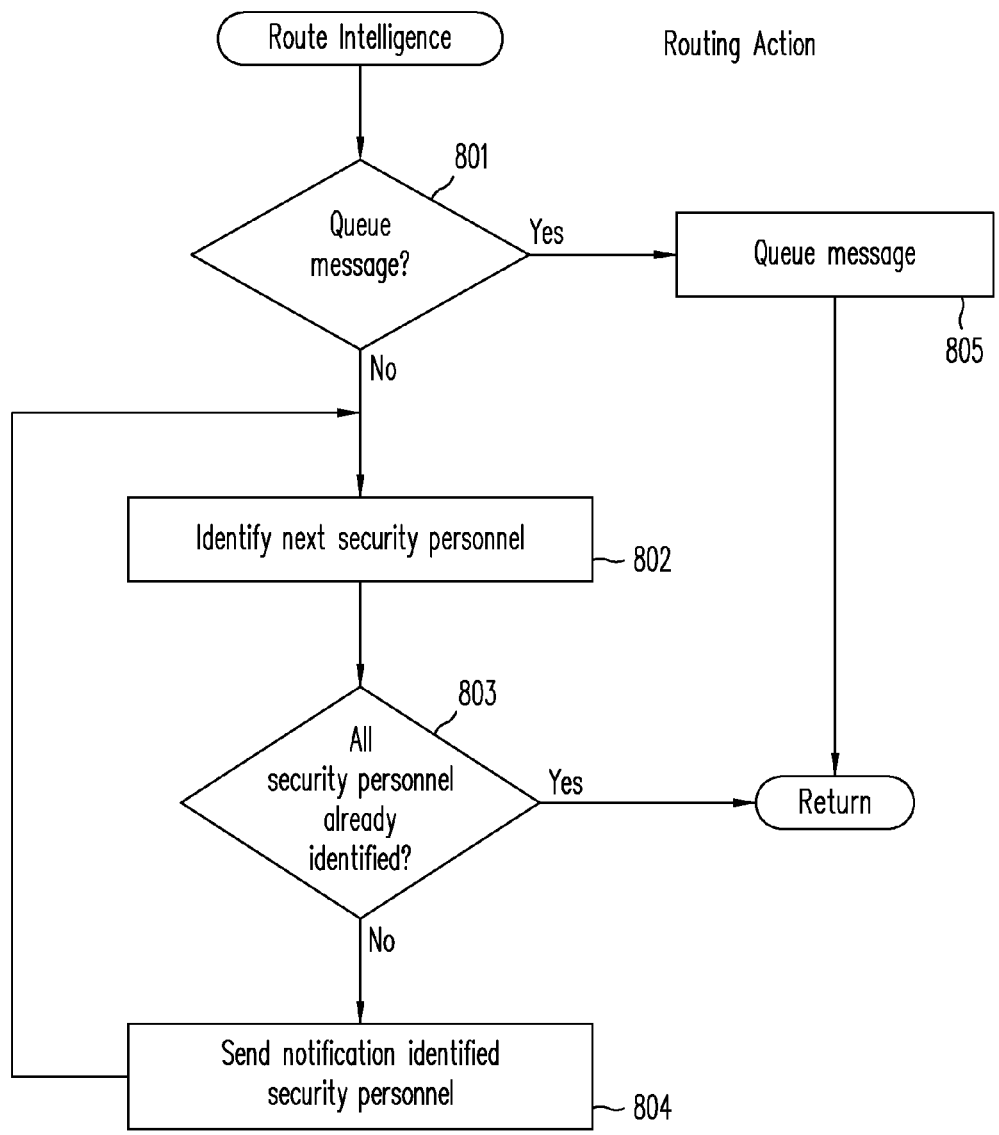
FIG. 8 is a flow diagram illustrating the routing of intelligence information in one embodiment.

FIG. 8 is a flow diagram illustrating the routing of intelligence information in one embodiment. This component may be passed the routing instructions and the intelligence information. In decision block 801, if the routing instructions indicate to queue the intelligence information, then the component continues at block 805, else the component continues at block 802. In blocks 802-804, the component loops, routing the intelligence information in accordance with the routing instructions. In block 802, the component identifies the next security entity (e.g., security personnel, security system, or security organization) that is to receive the intelligence information. In decision block 803, if all the security entities who are to receive the intelligence information have already been selected, then the component completes, else the component continues at block 804. In block 804, the component sends the notification to the identified security entity and then loops to block 802 to identify the next security entity. In block 805, the component queues the intelligence information so that it can be processed by the next available security personnel and then returns.

Figure 9:
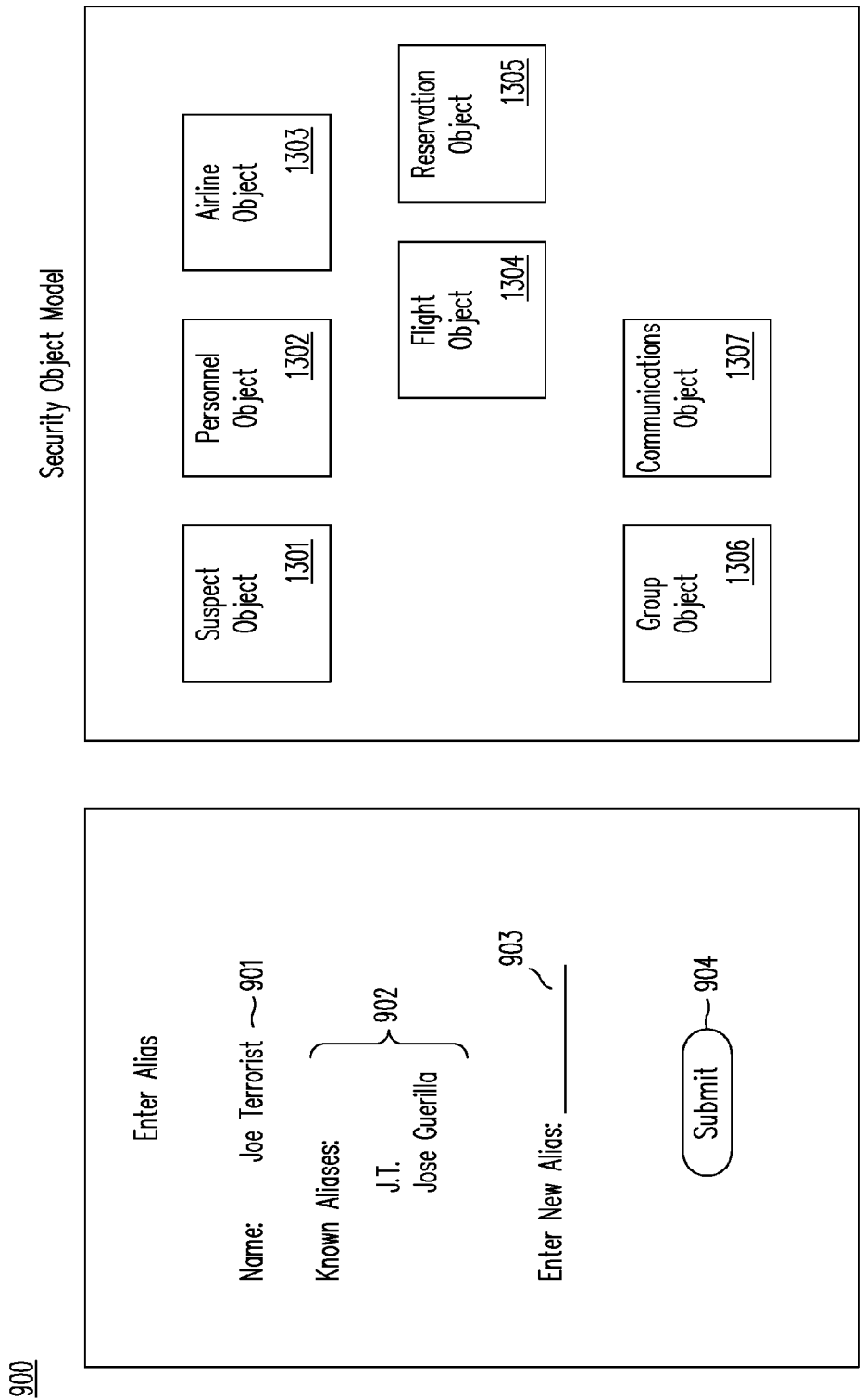
FIG. 9 illustrates a display page for entry of alias information in one embodiment.

FIG. 9 illustrates a display page for entry of alias information in one embodiment. The display page 900 allows security personnel to specify the aliases of a suspect. The display page includes the name of the suspect 901, the aliases of the suspect 902, an alias entry field 903, and a submit button 904. The security personnel may enter a new alias and press the submit button to add the new alias for the suspect to the list of known aliases. The security system, upon receiving the new alias, updates the security database to reflect the additional alias for the suspect.

Figure 10:
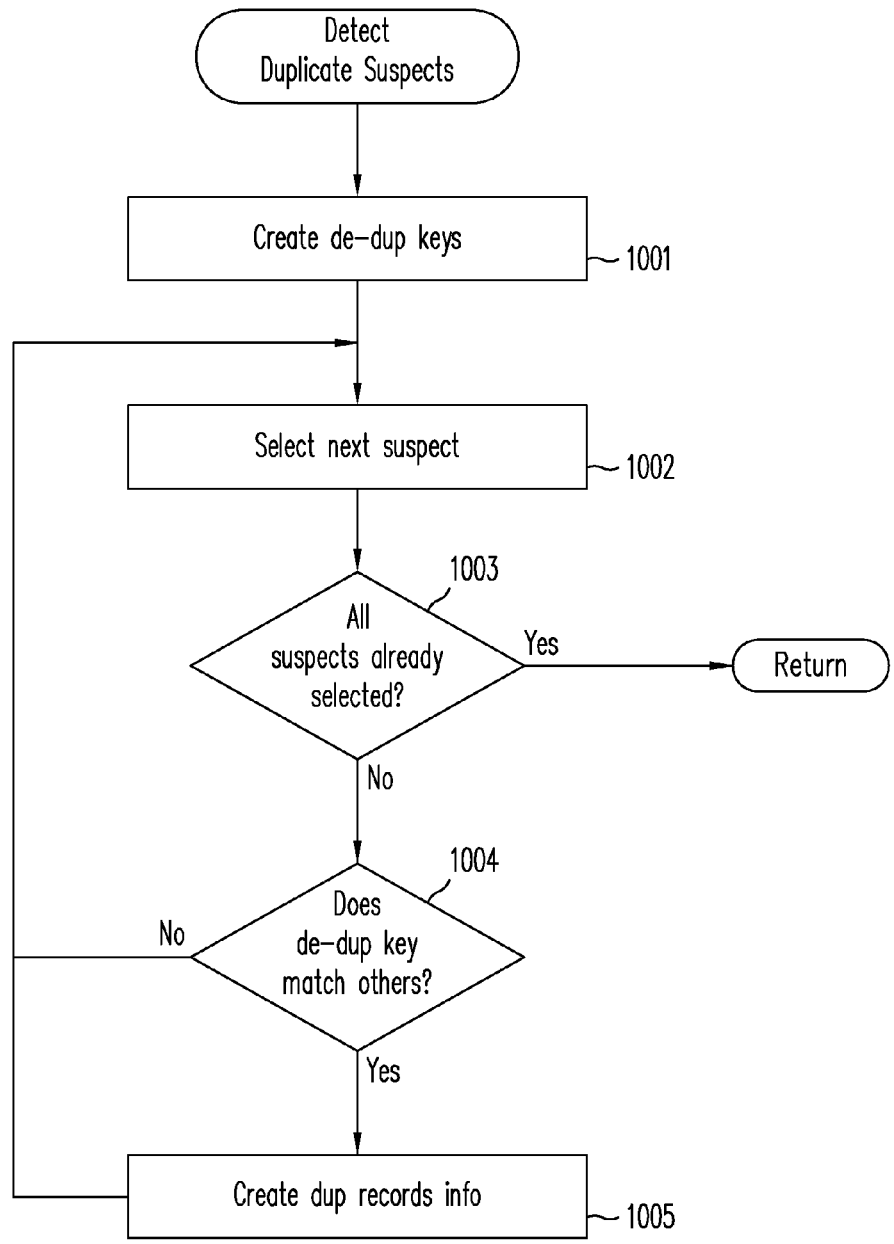
FIG. 10 is a flow diagram illustrating the detecting of multiple records for a single suspect in one embodiment.

FIG. 10 is a flow diagram illustrating the detecting of multiple records for a suspect in one embodiment. These multiple or duplicate records may represent different information for the same suspect. A similar detection process can be performed for groups of suspects. In block 1001, the component creates de-duplication keys for the suspect records. The de-duplication keys may contain portions of the name field, address field, and physical characteristics fields. In block 1002-1005, the component loops, determining whether each suspect record is a duplicate of another record. In block 1002, the component selects the next suspect record. In decision block 1003, if all the suspect records have already been selected, then the component completes, else the component continues at block 1004. In decision block 1004, if the de-duplication key of the selected suspect record matches other de-duplication keys, then the component continues at block 1005, else the component continues at block 1002 to select the next suspect record. In block 1005, the component generates a report indicating that there may be duplicate suspect records for the selected suspect record and then loops to block 1002 to select the next suspect record. The security system may allow security personnel to make the final determination of whether the duplicate records represent the same suspect.

Figure 11:
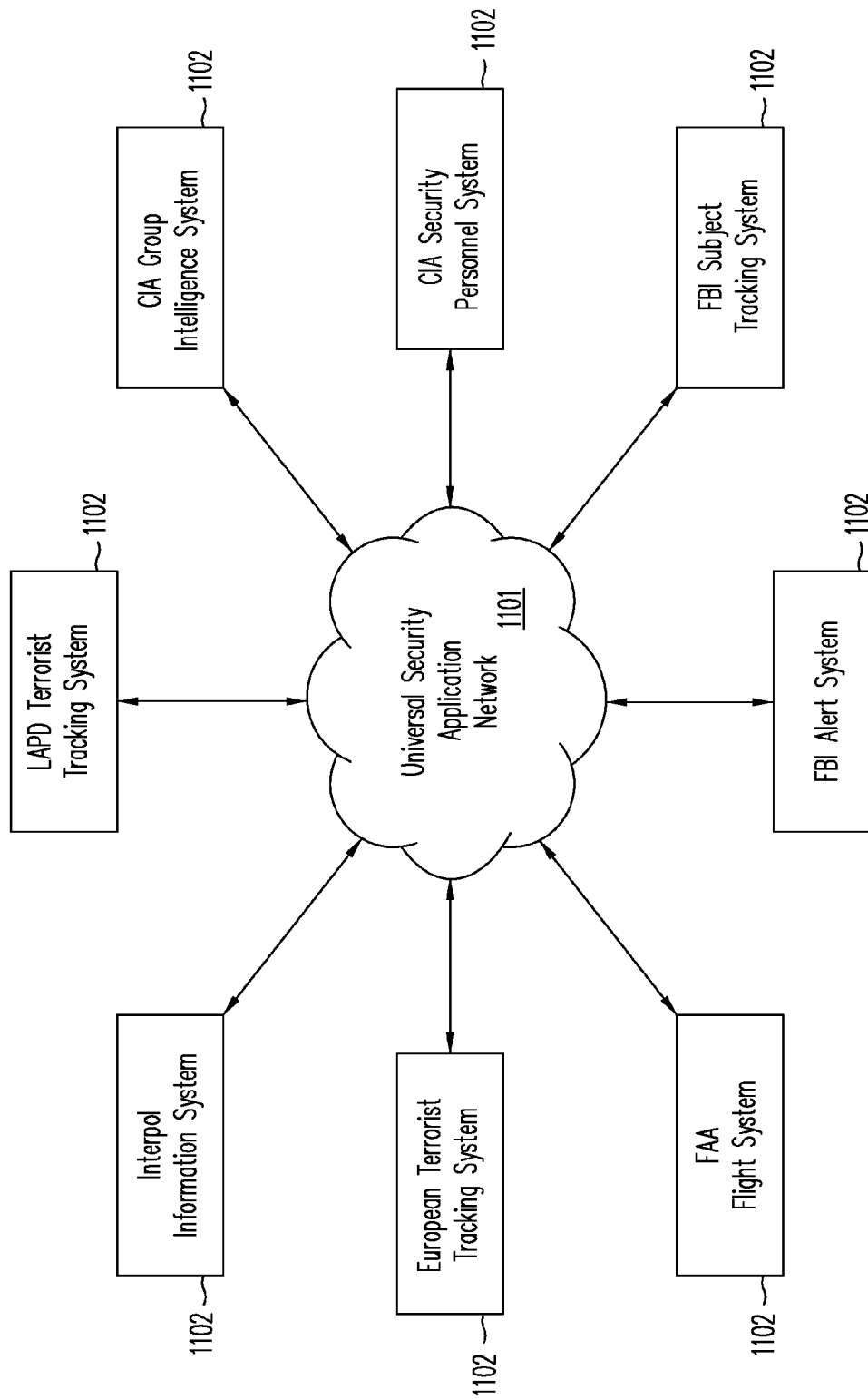
FIG. 11 is a block diagram illustrating the interconnection between security systems and the universal security application network.

FIG. 11 is a block diagram illustrating the interconnection between security systems and the universal security application network. The universal security application network 1101 serves as an integration hub for the external security systems 1102. The architecture of the universal security application network allows new security applications that access legacy security systems to be developed with minimum customization. The legacy security systems can be provided by a single security organization or by different security organizations. In one embodiment, the universal security application network uses the XML and Web services standards.

Figure 12:
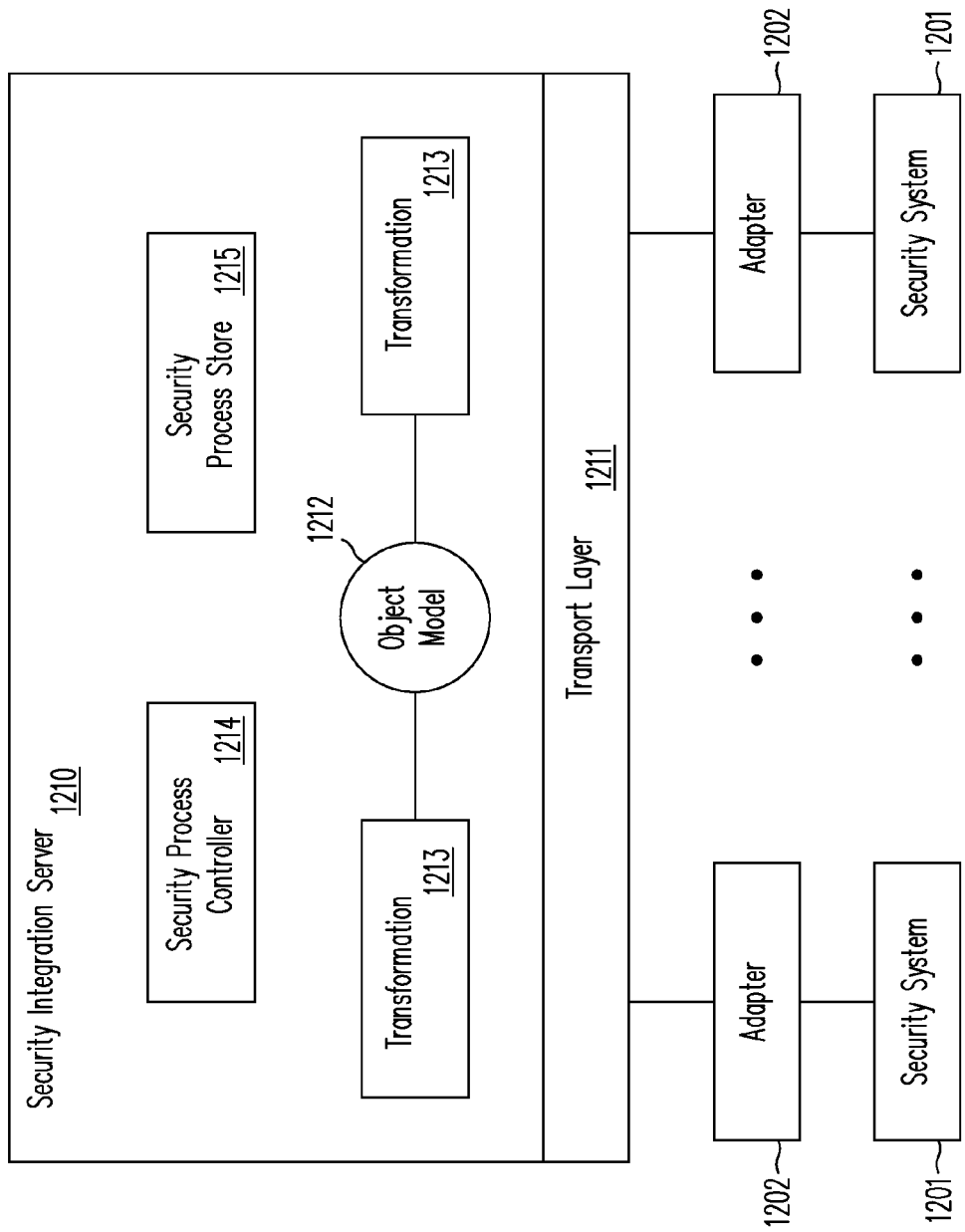
FIG. 12 is a block diagram illustrating the overall architecture of the universal security application network.

FIG. 12 is a block diagram illustrating the overall architecture of the universal security application network. The hub of the universal security application network is the security integration server 1210 that connects to the various security systems 1201 via adapters 1202. The security integration server includes a transport layer 1211, an object model 1212, a transformation store 1213, a security process controller 1214, and a security process store 1215. The transport layer is a mechanism through which intelligence information is exchanged between the security systems and the security integration server. Each security system may have an adapter that is appropriate to the protocol of the transport layer. For example, the transport mechanism may use communications protocols such as TCP/IP. The transport layer may provide a messaging service for queuing, for guaranteeing delivery of messages, and for handling both synchronous and asynchronous messaging, such as provided by IBM MQSeries and TIBCO Rendezvous.

The adapters relay events from the security systems to the integration server and can import configurations of the security systems into the security integration server. In addition, the universal security application network may include encryption and authentication mechanisms to ensure the security and integrity of the intelligence information. For example, authentication will help ensure that a security process is accessing the intended security system, rather than an impostor security system. The object model may contain the definition of various security-related objects. The objects may be defined using standard object definition tools. The defined objects may include a suspect object, a group object, a flight object, a communications object, etc. These object definitions specify the data and functions or methods associated with each object. For example, a suspect object may contain data such as name, address, nationality, color of hair, etc. The suspect object may have functions such as update a data field, get affiliated groups, get related communications, etc. The transformation store contains transformations for transforming intelligence information received from the security systems to the format used by the object model, and vice versa. For example, a suspect object may include a globally unique identifier for each suspect. A transformation for a security system that does not use globally unique identifiers may need to access an identification server to determine the globally unique identifier for each suspect. The transformations may be specified as a computer program, an XML stylesheet Language Transform ("XSLT"), etc. The security process store contains the security processes that have been defined. A security process may be specified as a script, a process flow, an executable program, etc. In one embodiment, the security processes are defined using the Web Services Flow Language ("WSFL"). The security processes orchestrate a sequence of steps across multiple applications provided by the security systems to achieve a security objective. The security process controller coordinates the execution of the security processes. The security process controller may instantiate objects and invoke functions of the objects in accordance with the various security processes. The security process controller may also initiate the execution of security processes based on predefined conditions and events. For example, the security process controller may launch a certain security process each time an FBI alert is received. Although not shown, the security integration network may provide a standard library of security routines that may be invoked by the security processes. For example, a standard security routine might be to identify whether two suspect objects represent the same individual, or to apply security rules to various objects and take the appropriate action as defined by those rules. The security integration server may also include various tools to facilitate the development of security processes. These tools may aid in the development of transformations, the defining of common objects, and the writing of process flows.

FIG. 13 is a block diagram illustrating various objects defined as part of the security object model. The security object model may include a suspect object 1301, a personnel object 1302, an airline object 1303, a flight object 1304, a reservation object 1305, a group object 1306, and a communications object 1307. The objects may be defined using the XML Schema Definition ("XSD") language.

Figure 14:
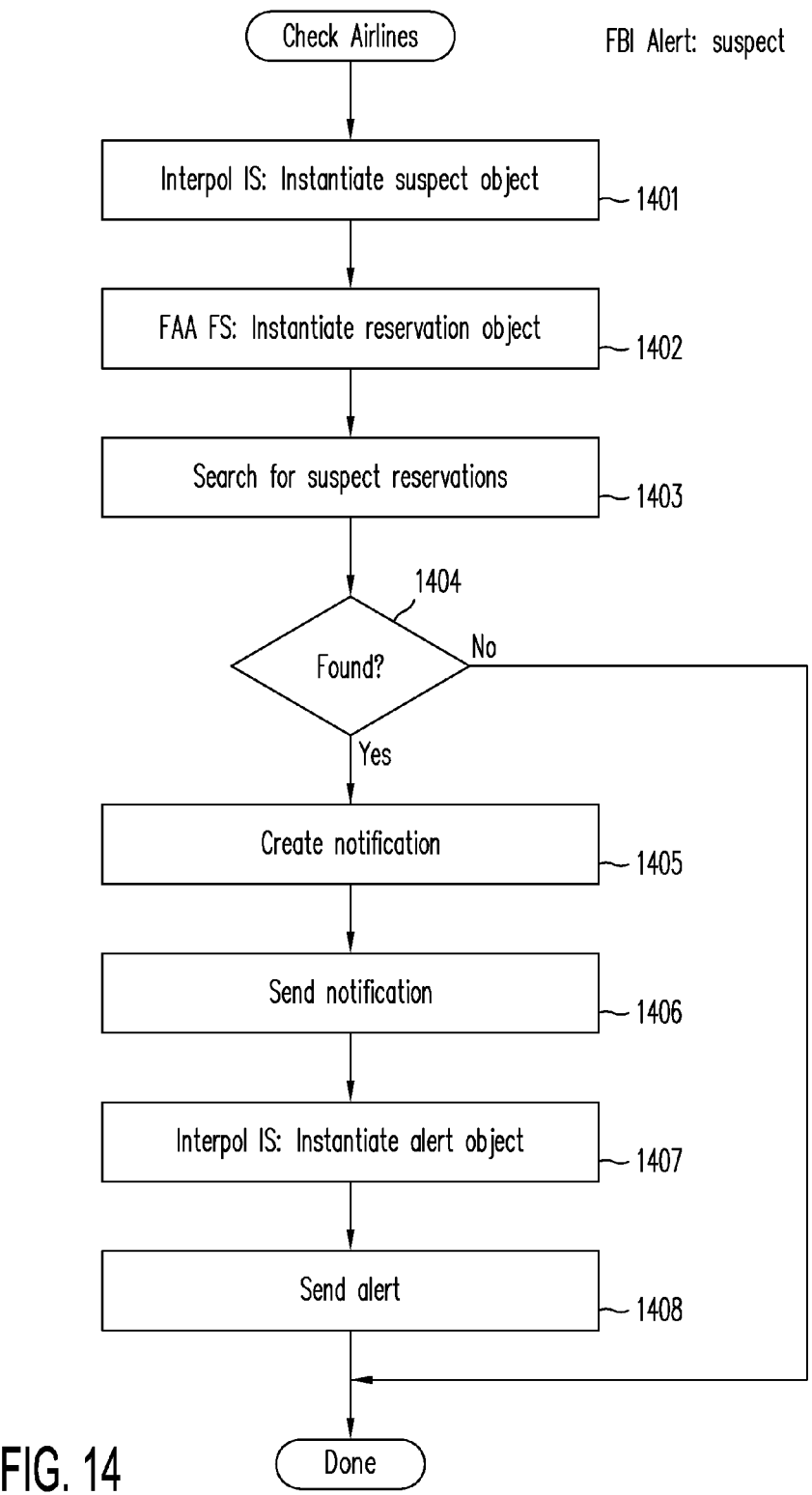
FIG. 14 is a flow diagram illustrating an example process flow of a security process in one embodiment.

FIG. 14 is a flow diagram illustrating an example process flow of a security process in one embodiment. This security process executes on the security integration server and performs the function of checking whether a suspect has a reservation on a flight. This security process may be invoked when a condition of a rule is satisfied, such as an FBI alert is received that identifies a suspect. In block 1401, the security process instantiates a suspect object based on information stored in an Interpol information system. To instantiate the object, a request is sent to the adapter for the Interpol information system for data relative to the suspect. When the response is received, the appropriate transformation is performed to add the data to the object. In block 1402, the security process instantiates a reservation object based on information stored in an FAA Flight System. In block 1403, the security process searches for any reservations for the suspect. The reservation object may include a search function that is passed a suspect object and returns an indication of the flights for which that suspect has a reservation. Alternatively, the security process may invoke a predefined security routine to perform the searching function. In decision block 1404, if a flight is found, then the security process continues at block 1405, else the security process completes. In block 1405, the security process creates a notification that may identify a suspect object. The suspect object may include a data field that identifies a CIA agent who is responsible for tracking the suspect. In block 1406, the security process sends the notification to the CIA agent. In block 1407, the security process instantiates an alert object for an alert that is to be sent to the Interpol information system. In block 1408, the security process invokes a function of the alert object to send the alert and then completes.

The universal security application network may use technology described in U.S. patent application Ser. No. 09/968,134, filed Sep. 29, 2001 and entitled "SYSTEM AND METHOD FOR QUEUING DATA FOR AN APPLICATION SERVER;" U.S. patent application Ser. No. 09/967,898, filed Sep. 28, 2001 and entitled "METHOD AND SYSTEM FOR TRACKING AND EXCHANGING INCREMENTAL CHANGES TO HIERARCHICAL OBJECTS;" U.S. patent application Ser. No. 09/968,735, filed Sep. 29, 2001 and entitled "METHOD AND SYSTEM FOR USING INTEGRATION OBJECTS WITH ENTERPRISE BUSINESS APPLICATIONS;" U.S. patent application Ser. No. 09/835,162, filed Apr. 13, 2001 and entitled "METHOD AND SYSTEM FOR MAPPING BETWEEN XML AND RELATIONAL REPRESENTATIONS," which are hereby incorporated by reference.

From the foregoing, it will be appreciated that although specific embodiments of the technology have been described herein for purposes of illustration, various modifications may be made without deviating from the spirit and scope of the invention. Accordingly, the invention is not limited except by the appended claims.

We claim:

1. A method in a computer system for identifying duplicate records relating to a suspect in an investigation, the method comprising:
   generating a de-duplication key for each record derived from content of various fields of the record;
   determining whether any de-duplication key for a record matches a de-duplication key for another record; and
   when it is determined that de-duplication keys match, indicating that the records with the matching keys may be duplicates, wherein
      de-duplication keys match when a metric indicates that the de-duplication keys are close enough that they may represent duplicate records, and
      the metric calculates a distance between the de-duplication keys.

2. The method of claim 1 wherein de-duplication keys match when they are the same.

3. The method of claim 1 wherein the de-duplication keys include information derived from names of suspects.

4. The method of claim 1 wherein the de-duplication keys include information derived from physical characteristics of suspects.

5. The method of claim 1 wherein the de-duplication keys include information derived from addresses of suspects.

6. The method of claim 1 wherein the de-duplication keys include information derived from aliases of suspects.

7. A method for identifying records that relate to the same entity, the method comprising:
   generating a key for a record of a security system and a key for a record of another security system, wherein
      the keys are derived from name and alias content of the records;
   comparing the generated key of the record of the security system to the generated key of the record of the other security system; and
   when the comparison indicates that the compared keys may represent the same entity,
      presenting an indication to a user that the record of the security system and the record of the other security system may represent the same entity, and
      receiving from the user an indication as to whether the records represent the same entity, wherein
      the keys are de-duplication keys, and
      the comparing includes applying a metric to the generated de-duplication keys.

8. The method of claim 7 wherein the entity is an individual.

9. The method of claim 7 wherein the entity is a group of individuals.

10. The method of claim 7 wherein the de-duplication keys are derived from characteristics of the entity.

11. The method of claim 7 wherein the names of the records represent different spellings of the same name.

12. The method of claim 7, further comprising:
   receiving alias information for an entity.

13. A computer-readable medium containing instructions for identifying records of a security system that relate to the same suspect, by a method comprising:
   generating a de-duplication key for a record of the security system and a de-duplication key for another record of the security system, wherein
      the de-duplication keys are derived from alias information of the records;
   comparing the generated de-duplication key of the record to the generated de-duplication key of the other record; and
   when the comparison indicates that the records may represent the same suspect, presenting an indication to a user that the records may represent the same suspect,
      receiving from the user an indication as to whether the records represent the same suspect, and
      when the user indicates that the records represent the same suspect, combining the records, wherein
      the comparing includes applying a metric to the generated de-duplication keys.

14. The computer-readable medium of claim 13 wherein the suspect is an individual.

15. The computer-readable medium of claim 13 wherein the suspect is a group of individuals.

16. The computer-readable medium of claim 13 wherein the de-duplication keys are derived from characteristics of the suspect.

17. The computer-readable medium of claim 13 wherein the names of the records represent different spellings of the same name.

18. The computer-readable medium of claim 13, further comprising:
   receiving alias information for a suspect.

* * * * *